Oct. 21, 1924. 1,512,353
M. MARCUS
COMBINATION BEARING AND CORNER BRACKET
Filed April 24, 1924
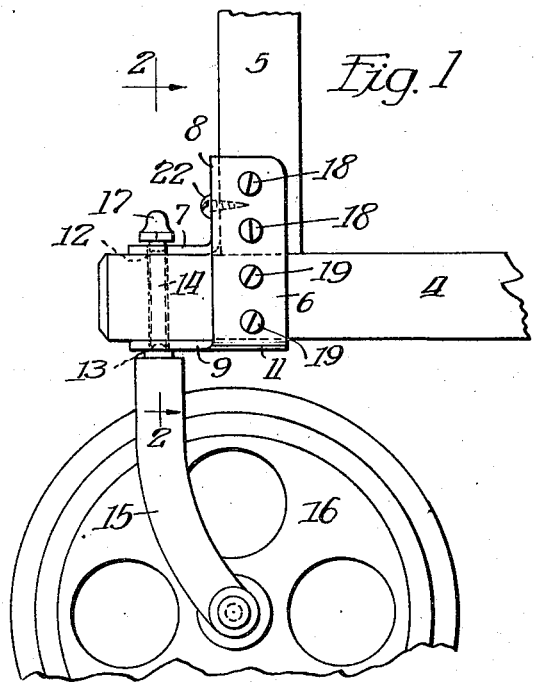
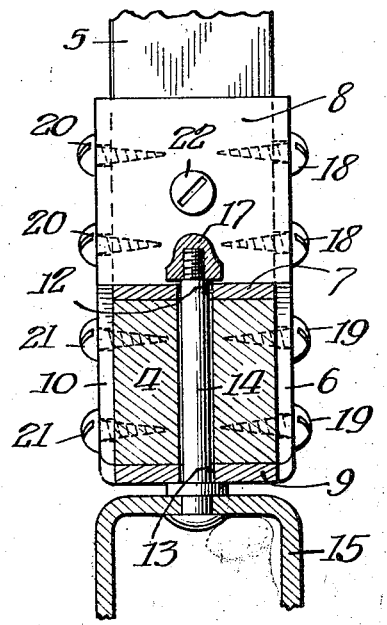
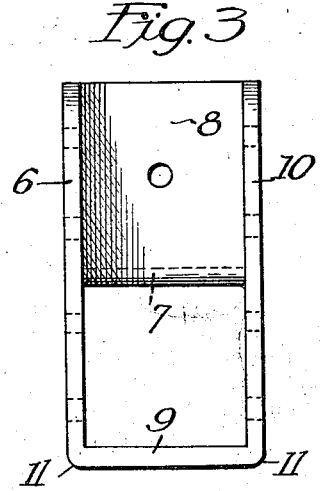
Inventor:
Max Marcus,
By George S. Pines Atty.

Patented Oct. 21, 1924.

1,512,353

UNITED STATES PATENT OFFICE.

MAX MARCUS, OF CHICAGO, ILLINOIS.

COMBINATION BEARING AND CORNER BRACKET.

Application filed April 24, 1924. Serial No. 708,636.

*To all whom it may concern:*

Be it known that I, MAX MARCUS, a citizen of the United States, resident of the city of Chicago, county of Cook, and State of Illinois, have invented certain new and useful Improvements in Combination Bearing and Corner Brackets, of which the following is a specification.

My invention relates to brackets the purpose of which is the securing of angularly disposed members, and to also form a bearing for a revolvable castor-fork shank.

More particularly, the invention has for its salient object the provision of a combined corner bracket and supporting plates for rigidly securing castor vehicle frame members together wherein the bracket portion also forms a double bearing for the spindle of a castor-fork. There are other objects which will appear from the descriptions.

With refrence to the accompanying drawings:—

Fig. 1 is an elevation of the bracket as mounted on the lower frame of a truck, infant's crib, or other portable device.

Fig. 2 is a section on the line 2—2 of Fig. 1.

Fig. 3 is an elevation of the bracket unmounted as appearing viewed as from the left in Fig. 1.

With reference to the drawings, 4 is one of the lower rails or frame members of the vehicle. 5 is an upright rail or frame member disposed at right-angles to the member 4. The members 4 and 5 are rigidly secured to each other by means of the portion 6 of the bracket of the present invention wherein a formed projection 7 is thrown out from and disposed at right-angles with the portion 8 of the bracket member, and wherein the portions 6 and 8 are formed at right-angles. The projection 9 is formed at right-angles with the portion 6 and is parallel to the projection 7. The portion 10 of the bracket is formed parallel to the portion 6; spaced with relation to the portion 6 by the portion 11. The portions 6, 11 and 10 thus form a stirrup wherein the members 4 and 5 fit snugly between; held abutting at right-angles. The projections 7 and 9 have aligned apertures 12 and 13 respectively, to receive the shank 14 of the castor-fork 15, which fork carries a vehicle wheel 16. A cap-nut 17 is screwed on the shank 14 to insure its placement, while permitting the shank 14 to freely revolve within the apertures 12 and 13 as bearings therefor. Screws 18 secure the portion 6 to member 4, and screws 19 secure the portion 6 to the member 4. Likewise, screws 20 secure the portion 10 (which is a formed continuation of portion 6) to the member 5, and screws 21 secure the portion 10 to member 4.

It is clear from the foregoing that the member 4 is rigidly secured to the end of member 5 through the agency of a stirrup formed by the portions 6, 11 and 10. The projection 7 forms a corner bracket with portion 8, and the spindle 14 retains the projection 7 rigid with respect to member 4. The spindle 14 likewise retains the projection 9 rigid with respect to member 4. The members 4 and 5 are thus not only rigidly retained from moving apart by the stirrup formed of the portions 6, 11 and 10, but the members 4 and 5 are held from slidable movement with respect to each other, due to the shank 14 passing through the projections 9 and 7 thrown from the stirrup portion 6 and the portion 8, respectively.

A salient feature of the invention is the disposition of the projection 7 and the portion 8 and the screw 22 wherein they serve to secure and brace the angular relation between the members 4 and 5, as well as forming a toe-brace for the member 5, making for rigidity and strength of union between the parts 4 and 5.

The invention is subject to detailed modification in its application to various kinds of vehicle structures and for facilitating manufacture, serviceability and for promoting appearance, without departing from the scope of the invention as defined by the subjoined claims.

I claim:—

1. In a bracket for connecting angularly disposed frame members, the combination of an L-shaped portion for the reception of the said angularly disposed members, a stirrup for binding the angularly disposed members, a projection of said stirrup parallel to one side of the L-shaped portion, bearing apertures in the said one side of the L-shaped portion and the said projection which register, a rotatable stem carried in the said bearing apertures, the said stem forming a key to effect an auxiliary connection between the angular members.

2. In a bracket for connecting two angularly disposed frame members, the combination of an L-shaped portion for the reception of the said angularly disposed members along the outer faces of the said L-shaped portion, a stirrup having its opposite ends secured to one of the said members and enclosing the other said member, a projection of said stirrup parallel to one side of the L-shaped portion and the said projection which register, a rotatable stem carried in the said bearing apertures, the said stem forming a key to effect an auxiliary connection between the angular members.

3. In a bracket for connecting two angularly disposed frame members, the combination of an L-shaped portion for the reception of the said angularly disposed members along the outer faces of the said L-shaped portion, a stirrup having its opposite ends secured to one of the said members and enclosing the other said member, a projection of said stirrup parallel to one side of the L-shaped portion and the said projection which register, a rotatable stem carried in the said bearing apertures, the said stem forming a key to effect an auxiliary connection between the angular members, the said stem having a collar portion for limiting its movement through the apertures, and a revolving castor-wheel carried by the stem for portably supporting the bracket and members.

4. In a bracket for connecting angularly disposed frame members, the combination of an L-shaped portion for the reception of the said angularly disposed members, a stirrup for binding the angularly disposed members, a projection of said stirrup parallel to one side of the L-shaped portion, bearing apertures in the said one side of the L-shaped portion and the said projection which register, and a rotatable stem carried in the said bearing apertures.

5. In a bracket for connecting angularly disposed frame members, the combination of an L-shaped portion for the reception of the said angularly disposed members, a stirrup for binding the angularly disposed members, a projection of said stirrup parallel to one side of the L-shaped portion, and the said projection which register, and a rotatable stem of a supporting castor-wheel carried in the said bearing apertures.

In witness whereof, I hereunto subscribe my name this 18th day of April, A. D., 1924.

MAX MARCUS.